UNITED STATES PATENT OFFICE.

HERMANN G. DITTBENNER, OF MINNEAPOLIS, MINNESOTA, ASSIGNOR TO DIAMOND IRON WORKS, A CORPORATION OF MINNESOTA.

FEED DEVICE FOR HORIZONTAL BAND-RESAWS.

No. 799,546.     Specification of Letters Patent.     Patented Sept. 12, 1905.

Application filed October 15, 1904. Serial No. 228,513.

*To all whom it may concern:*

Be it known that I, HERMANN G. DITTBENNER, of Minneapolis, Hennepin county, Minnesota, have invented certain new and useful Improvements in Feed Devices for Horizontal Band-Resaws, of which the following is a specification.

The object of my invention is to provide an upper feed mechanism for a horizontal resaw which will automatically adjust itself to the varying thickness of the lumber and will not have to be raised by the operator when a piece of lumber of unusual thickness approaches the saw.

A further object is to provide an upper feed mechanism that will hold the lumber in place on the lower feed device or belt and at the same time will aid in feeding it to the saw.

Further, the invention consists in various constructions and combinations, all as hereinafter described, and particularly pointed out in the claims.

Figure 1:
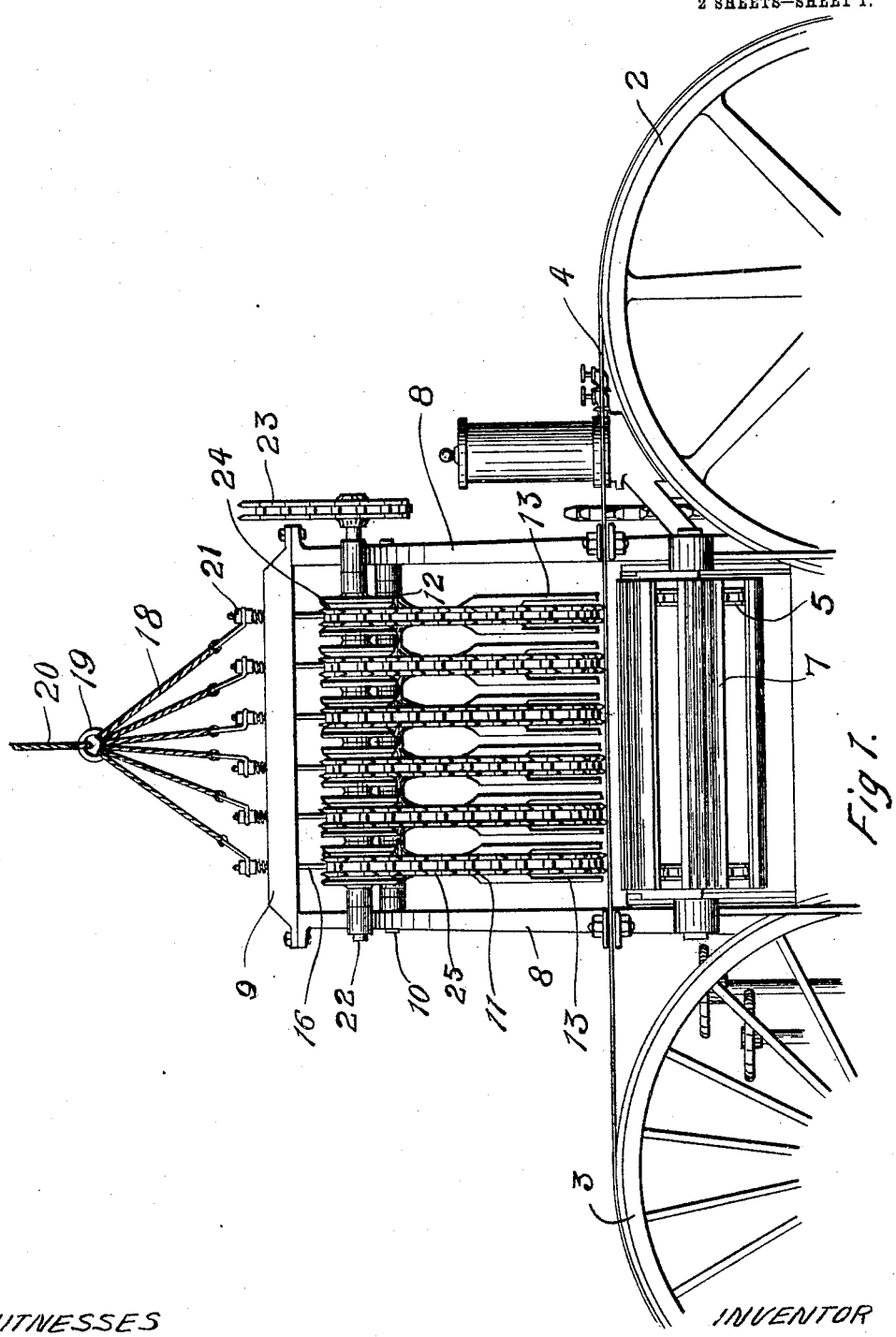
Figure 2:
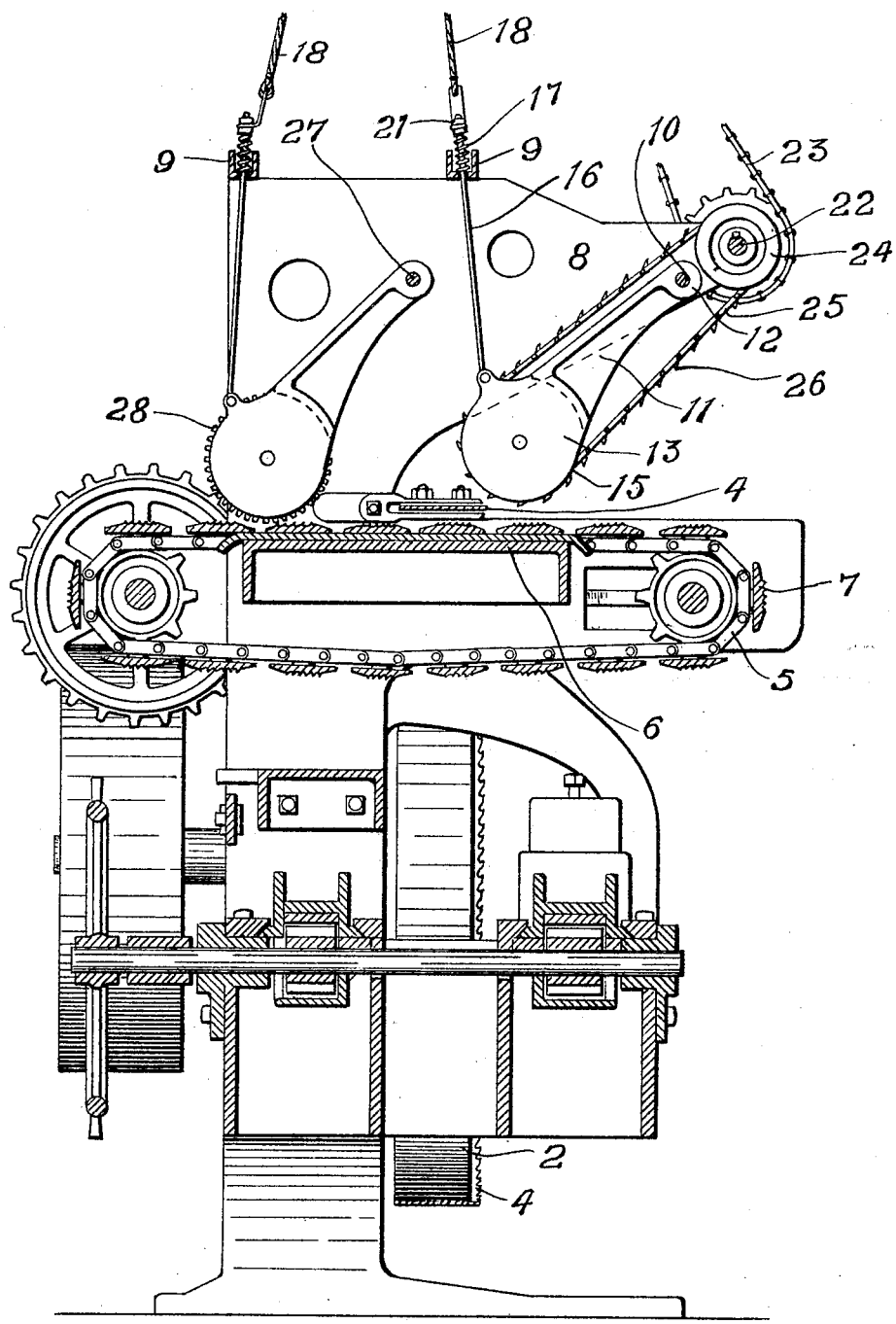

In the accompanying drawings, forming part of this specification, Figure 1 is a front view of a horizontal band-resaw with my invention applied thereto. Fig. 2 is a vertical transverse section.

In the drawings, 2 and 3 represent the band-saw wheels, 4 the saw, and 5 a belt operating over a table 6 beneath the saw and provided at intervals with plates 7, having upper corrugated surfaces that engage the under side of the lumber and feed it past the saw. Upon each side of the feed-belt are vertical standards or brackets 8, connected at the top by cross-bars 9. A shaft 10 is mounted in bearings in the standards 8 and provided at intervals with oscillating hangers 11, whose hubs 12 are loosely mounted on said shaft. The lower ends of said hangers are provided with disks 13, upon which sprocket-wheels 15 are centrally pivoted, the ends of the teeth of the sprockets being flush substantially with the peripheries of the disks 13. Each of the disks is provided with a rod 16, that extends up through one of the cross-bars 9 and is vertically movable therein, being limited in its downward movement by the compression-spring 17. Cables 18 lead from the upper ends of the rod 16 to a ring 19, to which an operating cable or rope 20 is attached and by means of which the attendant can raise or lower all of the disks and sprocket-wheels simultaneously. Each sprocket and disk, however, can be varied in its vertical adjustment with respect to the other by means of its rod 16 and the nuts 21, provided on the threaded upper end of the rod, between which and the bar 9 the compression-spring is placed.

Near the shaft 12 is a second shaft 22, driven by a chain 23 from the machine or any suitable source of power and provided with a series of sprocket-wheels 24, over which chains 25 pass to the sprockets 15, there being the same number of sprockets on the shaft 22 as there are mounted on the disks 13. The chains 25 are provided with spurs or teeth 26, there being preferably one spur on each link, and the spurs are slightly hooked, as shown in Fig. 2, to engage the forward end of the lumber and aid in feeding it to the saw. If a piece of lumber of unusual thickness is delivered to the feed-belt, the moving chain striking the forward upper corner of the lumber will rise automatically and allow the lumber to pass beneath without any attention on the part of the operator of the machine. Each chain and the lower sprocket-wheel therefor will accommodate itself to the varying thickness of the lumber, rising and falling and normally held by gravity upon the surface of the lumber to insure its proper feed to the saw.

On the discharge side of the saw I provide another series of hangers corresponding to those described, having disks at their lower ends and supported in a shaft 27, and each disk being provided with a toothed presser-wheel 28, that projects beyond the periphery of its disk and bears upon the lumber as it leaves the saw and holds it in place on the feed-belt. These wheels on the discharge side of the saw rise and fall with the variation in the thickness of the lumber and are provided with means similar to that above described to enable the operator to raise or lower them simultaneously or adjust each one vertically independent of the other.

I claim as my invention—

1. In a horizontal band resawing-machine, the combination, with a saw, of a feed mechanism operating beneath the same, a shaft above said mechanism, a series of hangers loosely mounted thereon and having disks at their lower ends, sprockets mounted on said disks and having their teeth substantially flush with the peripheries thereof, a second shaft, sprockets secured thereon, means for driving said second shaft, chains connecting the opposite sprockets on said shafts, and said chains having spurs or teeth that project beyond the peripheries of said disks and are adapted to engage the upper surface of the lumber, substantially as described.

2. In a horizontal band resawing-machine, the combination, with a saw, of a feed mechanism operating horizontally below the level of the upper section of the saw to advance the lumber thereto, and a series of toothed feed-belts arranged above said mechanism and operating at an angle with respect to the plane of the same and overhanging the cutting edge of the saw and adapted to engage the upper surface of the lumber and hold it upon said mechanism and aid in advancing it to the saw, and said belts being capable of yielding vertically and adjusting themselves automatically to the varying thickness of the lumber.

3. In a resawing-machine, the combination, with a saw, of a horizontal feed device operating beneath the same, a floating feed-belt supported above said feed device obliquely with respect to the plane thereof, said belt being provided with teeth which approach the surface of the lumber on said feed device at an acute angle and engaging therewith aid in advancing it to the saw, said belt moving vertically to accommodate itself to the varying thickness of the lumber, and the angle of approach of said belt and teeth to the lumber allowing them to pass over the end of lumber of unusual thickness as it enters the machine without any attention on the part of the operator.

4. In a resawing-machine, the combination, with a saw, of a feed device operating beneath the same, a series of floating feed-belts supported above said feed device obliquely with respect to the plane thereof, said belts being provided with a series of curved teeth which approach the surface of the lumber at an acute angle and engaging therewith aid in advancing it to the saw, said belts moving vertically to accommodate themselves to the varying thickness of the lumber, and the angle of approach of said belts and teeth to the lumber permitting them to automatically adjust themselves and pass over the end of lumber of unusual thickness, substantially as described and for the purpose specified.

In witness whereof I have hereunto set my hand this 8th day of October, 1904.

HERMANN G. DITTBENNER.

Witnesses:
RICHARD PAUL,
C. MACNAMARA.